(12) United States Patent
Chen et al.

(10) Patent No.: US 8,625,269 B2
(45) Date of Patent: *Jan. 7, 2014

(54) SERIAL ADVANCED TECHNOLOGY ATTACHMENT DIMM

(75) Inventors: Yung-Chieh Chen, New Taipei (TW); Shou-Kuo Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 53 days.

This patent is subject to a terminal disclaimer.

(21) Appl. No.: 13/172,603

(22) Filed: Jun. 29, 2011

(65) Prior Publication Data

US 2012/0320518 A1    Dec. 20, 2012

(30) Foreign Application Priority Data

Jun. 14, 2011    (TW) .................................. 100120781

(51) Int. Cl.
*G06F 1/16*    (2006.01)
(52) U.S. Cl.
USPC ................. 361/679.31; 361/679.32; 361/737; 361/785

(58) Field of Classification Search
USPC .................. 361/679.31, 728, 679.01, 679.02, 361/679.32, 679.4, 679.41, 737, 748, 361/784–789, 792, 803; 439/43, 45
See application file for complete search history.

(56) References Cited

U.S. PATENT DOCUMENTS

| | | | |
|---|---|---|---|
| 2009/0257184 A1* | 10/2009 | Lee et al. ................. | 361/679.32 |
| 2010/0087094 A1* | 4/2010 | Chen et al. ............... | 439/607.01 |
| 2012/0212988 A1* | 8/2012 | Sugita et al. ............. | 365/51 |
| 2013/0003285 A1* | 1/2013 | Liang et al. .............. | 361/679.31 |

* cited by examiner

*Primary Examiner* — Timothy Thompson
*Assistant Examiner* — Amol Patel
(74) *Attorney, Agent, or Firm* — Altis Law Group, Inc.

(57) ABSTRACT

A serial advanced technology attachment (SATA) DIMM includes a board body. A control chip is arranged on the board body. An extending board extends from an end of the board body. A first edge connector is set on the extending board. A second edge connector is set on a bottom side of the board body. The first edge connector includes a number of signal pins connected to the control chip, and a number of ground pins.

4 Claims, 2 Drawing Sheets

SERIAL ADVANCED TECHNOLOGY ATTACHMENT DIMM

BACKGROUND

1. Technical Field

The present disclosure relates to a serial advanced technology attachment (SATA) DIMM.

2. Description of Related Art

Solid state drives (SSD) store data on chips instead of magnetic or optical discs as traditional drives. One type of SSD has the form factor of a dual-in-line memory module (DIMM) module and is called a serial advanced technology attachment (SATA) DIMM. As such, the SATADIMM can be inserted into a memory slot of a motherboard, to receive a voltage from the motherboard through the memory slot. However, hard disk drive (HDD) signals need to be transmitted between the SATADIMM and the motherboard through a SATA connector set on the SATADIMM connected to a SATA connector of the motherboard. Moreover, the SATA connector set on the SATADIMM may occupy a lot of space. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by limitation. References to "an" or "one" embodiment in this disclosure are not necessarily to the same embodiment, and such references mean at least one.

Figure 1:
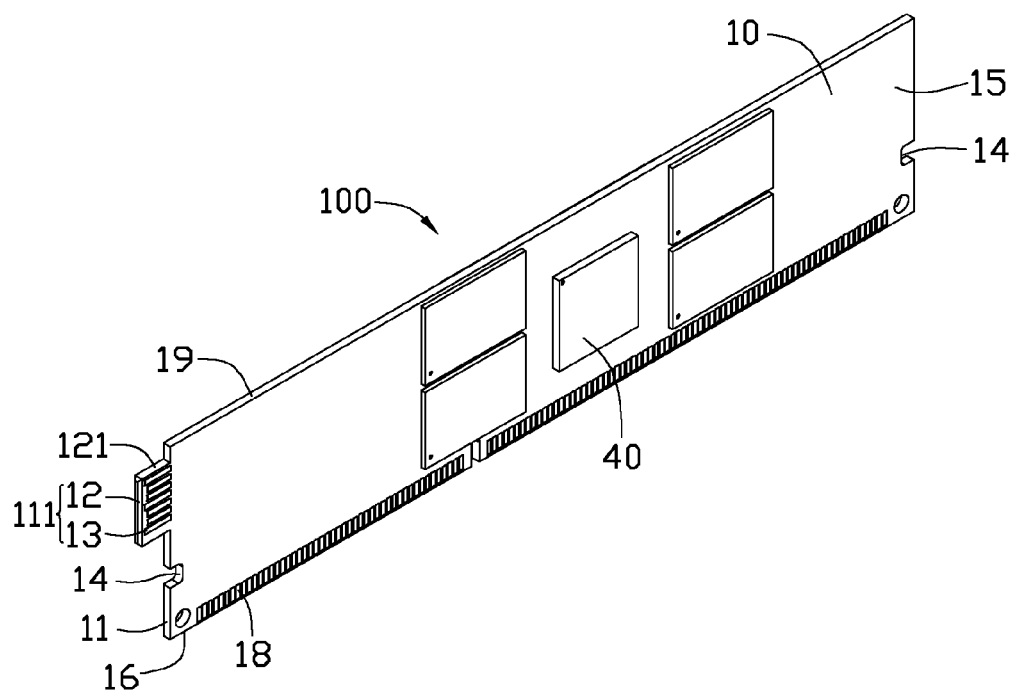
FIG. 1 is a schematic diagram of a serial advanced technology attachment (SATA) DIMM in accordance with an exemplary embodiment of the present disclosure.
Figure 2:
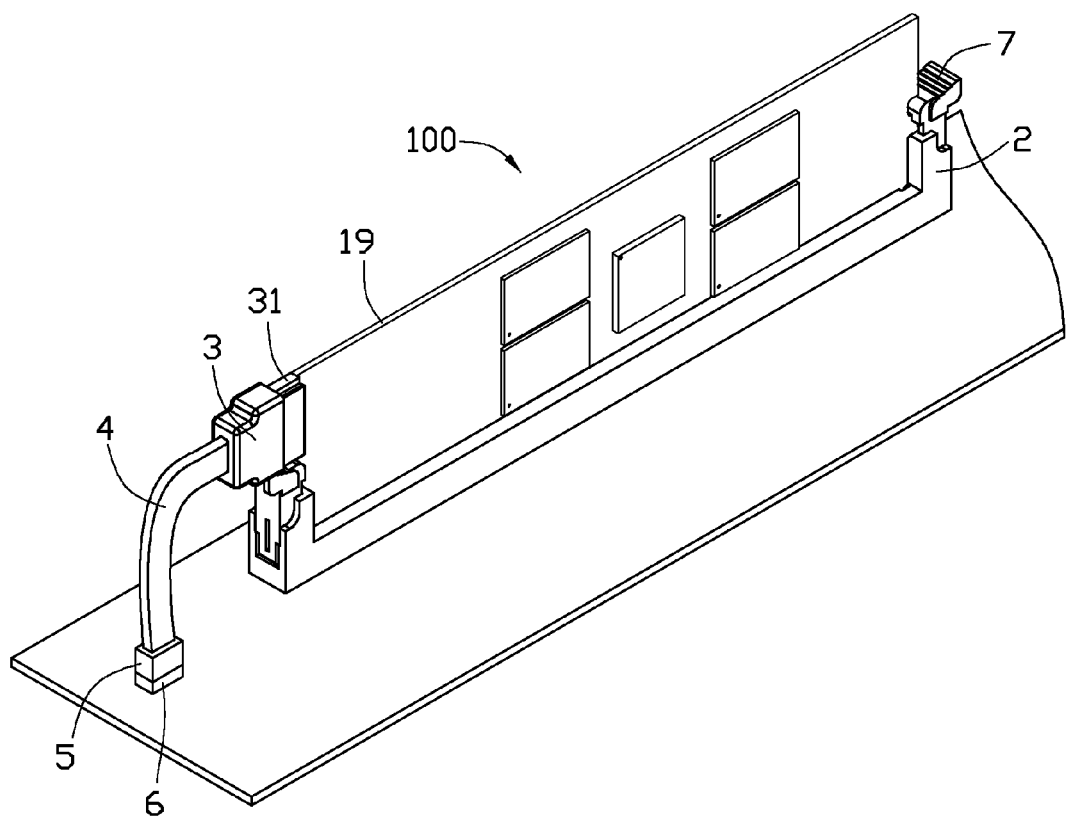
FIG. 2 is a schematic diagram of the SATADIMM of FIG. 1 connected to a motherboard.

Referring to FIGS. 1 and 2, a serial advanced technology attachment (SATA) DIMM 100 in accordance with an exemplary embodiment includes a board body 10. The board body 10 is substantially rectangle-shaped. A control chip 40 is arranged on the board body 10. An edge connector 18 is set on a bottom side 16 of the board body 10. An extending board 12 is extended from a first end 11 of the board body 10. An edge connector 13 is set on the extending board 12. Two grooves 14, one defined in the first end 11 of the board body 10 and located under the extending board 12, and other defined in a second end 15 of the board body 10, corresponding to the groove 14. The edge connector 13 and the extending board 12 compose a storage device connector 111.

A top surface 121 of the extending board 12 is lower than a top side 19 of the board body 10 opposite to the bottom side 16. When the storage device connector 111 is connected to a storage device interface 3, a top surface 31 of the storage device interface 3 is lower than or coplanar with the top side 19 of the board body 10. Thus, reducing the interference between the SATADIMM 100 and a chassis (not shown) when the SATADIMM 100 is mounted on a motherboard 1 accommodated in the chassis. The edge connector 18 is inserted into a memory slot 2 of the motherboard 1.

The edge connector 13 includes a plurality of signal pins (not labeled) and a plurality of ground pins (not labeled). The signal pins includes a pair of signal input pins and a pair of signal output pins. The ground pins includes three ground pins. The signal input pins and the signal output pins are connected to the control chip 40 through conductive lines of the board body 10. The ground pins are connected to a ground layer (not shown) of the board body 10, to be grounded.

In one embodiment, the storage device connector 111 is in accordance with a serial advanced technology attachment (SATA) standard. The storage device interface 3 is an SATA connector. In other embodiments, the storage device connector 111 can be set on another side or end of the board body 10, such as the top side 19 or the second end 15, according to need.

In use, the edge connector 18 of the SATADIMM 100 is inserted into the memory slot 2 of the motherboard 1. The grooves 14 engage with fixing elements 7 of the memory slot 2, to fix the SATADIMM 100 to the memory slot 2. The storage device connector 111 is connected to the storage device interface 3, to electrically connect the edge connector 13 to the storage device interface 3. The top surface 31 of the storage device interface 3 is lower than or coplanar with the top side 19 of the board body 10, to avoid interference. A storage device interface 5 is connected to the storage device interface 3 through a cable 4 and also connected to a storage device interface 6 of the motherboard 1.

When the motherboard 1 is powered on, the motherboard 1 outputs a voltage to the DATADIMM 100 through the memory slot 2 and the edge connector 18 of the board body 10. At the same time, the motherboard 1 outputs a hard disk drive (HDD) signal to the control chip 40 of the SATADIMM 100 through the storage device interfaces 6 and 5, the cable 4, the storage device interface 3, and the edge connector 13 of the storage device connector 111, to communicate with the SATADIMM 100.

The SATADIMM 100 can communicate with the motherboard 1 through the storage device connector 111, which set on an end of the board body 10 of the SATADIMM 100 for replacing a general SATA connector set on the SATADIMM 100, to save more space of the SATADIMM 100.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A serial advanced technology attachment (SATA) dual-in-line memory module (DIMM) comprising:
   a board body;
   a control chip arranged on the board body;
   an extending board extending from an end of the board body, a first edge connector set on the extending board, to be connected to a motherboard; and
   a second edge connector set on a bottom side of the board body, to be inserted into a memory slot of the motherboard, the first edge connector comprising a plurality of signal pins connected to the control chip, and a plurality of ground pins;
   when the motherboard is powered on, the motherboard outputs a voltage to the SATADIMM through the memory slot of the motherboard and the second edge connector, and the motherboard also outputs a hard disk drive signal to the control chip of the SATADIMM through the first edge connector, to communicate with the SATADIMM.

2. The SATADIMM of claim 1, wherein the extending board and the first edge connector compose a storage device connector, the storage device connector conforms with a serial advanced technology attachment (SATA) standard.

3. The SATADIMM of claim 1, wherein the plurality of signal pins comprises a pair of signal input pins and a pair of signal output pins.

4. The SATADIMM of claim 1, wherein a top surface of the extending board is lower than a top side of the board body opposite to the bottom side, when a storage device interface is connected to the first edge connector, a top surface of the storage device interface is lower than or coplanar with the top side of the board body.

* * * * *